United States Patent [19]

Hopkins

[11] 3,895,499

[45] July 22, 1975

[54] ABSORPTION REFRIGERATION SYSTEM AND METHOD

[75] Inventor: Neil E. Hopkins, York, Pa.

[73] Assignee: Borg-Warner Corporation, Chicago, Ill.

[22] Filed: May 29, 1974

[21] Appl. No.: 474,299

[52] U.S. Cl. .................... 62/101; 62/141; 62/148; 62/476
[51] Int. Cl. ........................................... F25b 15/06
[58] Field of Search ............ 62/101, 103, 105, 141, 62/148, 476, 489

[56] References Cited
UNITED STATES PATENTS

| | | | |
|---|---|---|---|
| 3,002,359 | 10/1961 | Miner | 62/148 |
| 3,005,318 | 10/1961 | Miner | 62/141 |
| 3,122,002 | 2/1964 | Miner et al. | 62/141 |
| 3,306,073 | 2/1967 | Stephan | 62/141 X |
| 3,314,246 | 4/1967 | Hopkins et al. | 62/101 |
| 3,314,246 | 4/1967 | Hopkins et al. | 62/101 |
| 3,410,104 | 11/1968 | Hopkins | 62/148 |
| 3,426,547 | 2/1969 | Foster | 62/141 X |
| 3,426,547 | 2/1969 | Foster | 62/101 |
| 3,528,489 | 4/1970 | Bell, Jr. | 62/497 X |
| 3,555,839 | 1/1971 | Leonard, Jr. | 62/101 |
| 3,593,540 | 7/1971 | Hopkins | 62/476 |
| 3,625,021 | 12/1971 | Dyre | 62/148 |
| 3,626,710 | 12/1971 | Porter | 62/141 |
| 3,626,710 | 12/1971 | Porter | 62/141 |
| 3,695,052 | 10/1972 | Griffin | 62/101 |
| 3,744,265 | 7/1973 | Bawel | 62/141 |

FOREIGN PATENTS OR APPLICATIONS

17,338 7/1968 Japan.................................. 62/141

*Primary Examiner*—William F. O'Dea
*Assistant Examiner*—Peter D. Ferguson
*Attorney, Agent, or Firm*—Thomas B. Hunter

[57] ABSTRACT

The conventional cooling tower bypass line and associated three-way valve are omitted from the cooling circuit of an absorption refrigeration system, whereby the temperature of the cooling medium entering the absorber coil is permitted to vary as the ambient temperature varies. Disclosed are a method and apparatus which provide continuous, stable operation of the system under these conditions.

3 Claims, 2 Drawing Figures

ABSORPTION REFRIGERATION SYSTEM AND METHOD

This is a continuation of application Ser. No. 278,412 filed Aug. 2, 1972, now abandoned.

BACKGROUND OF THE INVENTION

The present invention relates generally to a method of and means for operating an absorption refrigeration system, and more particularly, to a method of and means for operating such a system with widely variable cooling-medium temperatures.

In a typical absorption refrigeration system a liquid chilled in an evaporator is circulated to a refrigeration load, such as one or more remotely located air-conditioning units or a cooling system for an industrial process, the refrigerant vaporized in the evaporator passing to an absorber for absorption by a solution having a strong affinity for the refrigerant. The absorbent solution is thereby diluted, and the heat of solution is removed by circulating a cooling medium in a cooling coil provided in the absorber. The dilute solution is heated in a generator to evaporate refrigerant, the resulting concentrated solution being returned to the absorber. The evaporated refrigerant passes to a condenser where the heat of evaporation is abstracted by a cooling medium circulated in a condenser coil, and the condensate so formed is returned to the evaporator where it is circulated in a refrigerant circuit by means of a refrigerant pump. Water is frequently used as the refrigerant, the chilled fluid and the cooling media, and the source of heat in the generator may be steam or hot water circulated in a heating coil. When the refrigerant is water, the absorbent solution is typically a hygroscopic brine such as an aqueous solution of lithium bromide or lithium chloride. As is well known, however, a large number of fluids with widely varying characteristics may be used in absorption refrigeration systems.

The absorber cooling coil is connected in a cooling circuit which usually also incudes the condenser coil conveniently situated in series with the cooling coil. The cooling water is conducted from the condenser coil to a remotely located cooling tower where the heat abstracted in the absorber and in the condenser is rejected to ambient air; that is, the air out-of-doors. Alternatively, and where feasible, the cooling water may be drawn from a body of water such as a lake, a stream, an artificial pool or a deep well, and returned directly or indirectly thereto, the body of a water thus forming a portion of the cooling circuit.

The temperature of the heated cooling water must be so relates to the temperature of the ambient air as to provide a favorable heat-transfer relationship. Since refrigeration requirements are usually greatest during periods of high ambient temperatures, absorption refrigeration systems are customarily designed to be operated with correspondingly high cooling-water temperature, and it has generally been considered necessary for stable operation of the system to provide controls which act to maintain these temperatures within a narrow critical range despite diurnal and seasonal variations in the ambient temperature.

Such controls normally consist of a cooling tower bypass line and an associated three-way valve, so arranged that, at reduced ambient temperatures, all or a variable portion of the cooling water can be bypassed around the cooling tower as necessary to maintain the design temperature. The position of the three-way valve is dictated by a valve control which continuously senses the temperature of the cooling water entering the absorber coil. Similar bypass arrangements are provided when the source of the cooling medium is a body of water of variable temperature. A conventional cooling tower bypass arrangement is shown schematically and described in U.S. Pat. No. 3,640,084, issued Feb. 8, 1972 to N. E. Hopkins and P. W. Muench and assigned to the assignee of the present invention.

Because of the importance heretofore attributed to the requirement for maintaining the temperature of the cooling water as close as possible to the design temperature, it has been necessary that the cooling-water temperature controls be wholly reliable and relatively sensitive. This requirement, together with the expenses of layout and installation of the bypass line, the three-way valve and the valve control, has added substantially to the initial cost of the system.

On the other hand, if the temperature of the cooling water is permitted to vary with changes in the ambient temperature; that is, if the above-described temperature controls are omitted or rendered inoperative, the requirement for heat input to the generator is reduced as the cooling-water temperature falls, thereby permitting an economy that cannot be realized with uniformly high cooling-water temperatures.

However, failure to exercise close control of the cooling-water temperature gives rise to a number of operating problems, a leading one of which stems from the fact that, as the cooling-water temperature falls, the concentration of the absorbent solution is reduced. This is aggravated by the fact that the concentration is also reduced in response to reduction of the refrigeration load, a condition that can normally be expected in most installations when the ambient temperature falls. Thus, without cooling-water temperature control, a decreasing ambient temperature can quickly cause excessive dilution of the absorbent solution, with consequent rapid depletion of refrigerant from the refrigerant circuit, as the system seeks operational equilibrium under the new conditions. If the system is permitted to remain in operation and no corrective measures are taken, the loss of refrigerant from the refrigerant circuit will quickly result in severe cavitation at the refrigerant pump. The present invention is addressed primarily to the solution of this problem.

SUMMARY OF THE INVENTION

In accordance with the invention, absorbent solution is added to the liquid in the refrigerant circuit in response to reduction of the volume of liquid in the refrigerant circuit to a predetermined value.

Thus, if the volume of liquid in the refrigerant circuit is reduced to a predetermined minimum or critical level as a result of low cooling-water temperatures or reduced refrigeration loads, or the combined effect of both, absorbent solution is introduced into the refrigerant circuit to maintain the minimum level or to increase the volume of liquid in the refrigerant circuit to a predetermined higher level. This not only ensures that sufficient liquid will be maintained in the refrigerant circuit to prevent cavitation at the refrigerant pump, it also reduces the capacity of the solution for absorption and thus inhibits further depletion of refrigerant. If loss of refrigerant from the refrigerant circuit continues, additional absorbent solution is introduced into the circuit as necessary.

Means are provided in accordance with the invention for operating the system in such a manner.

These and other objects, features and advantages of the invention will be apparent from the following description taken in conjunction with the accompanying drawing.

THE PREFERRED EMBODIMENT

The refrigeration systems shown in the drawings are particularly well adapted for application of the principles of the invention, although it will be obvious that the invention can be applied with facility to other absorption refrigeration systems.

Figure 1:
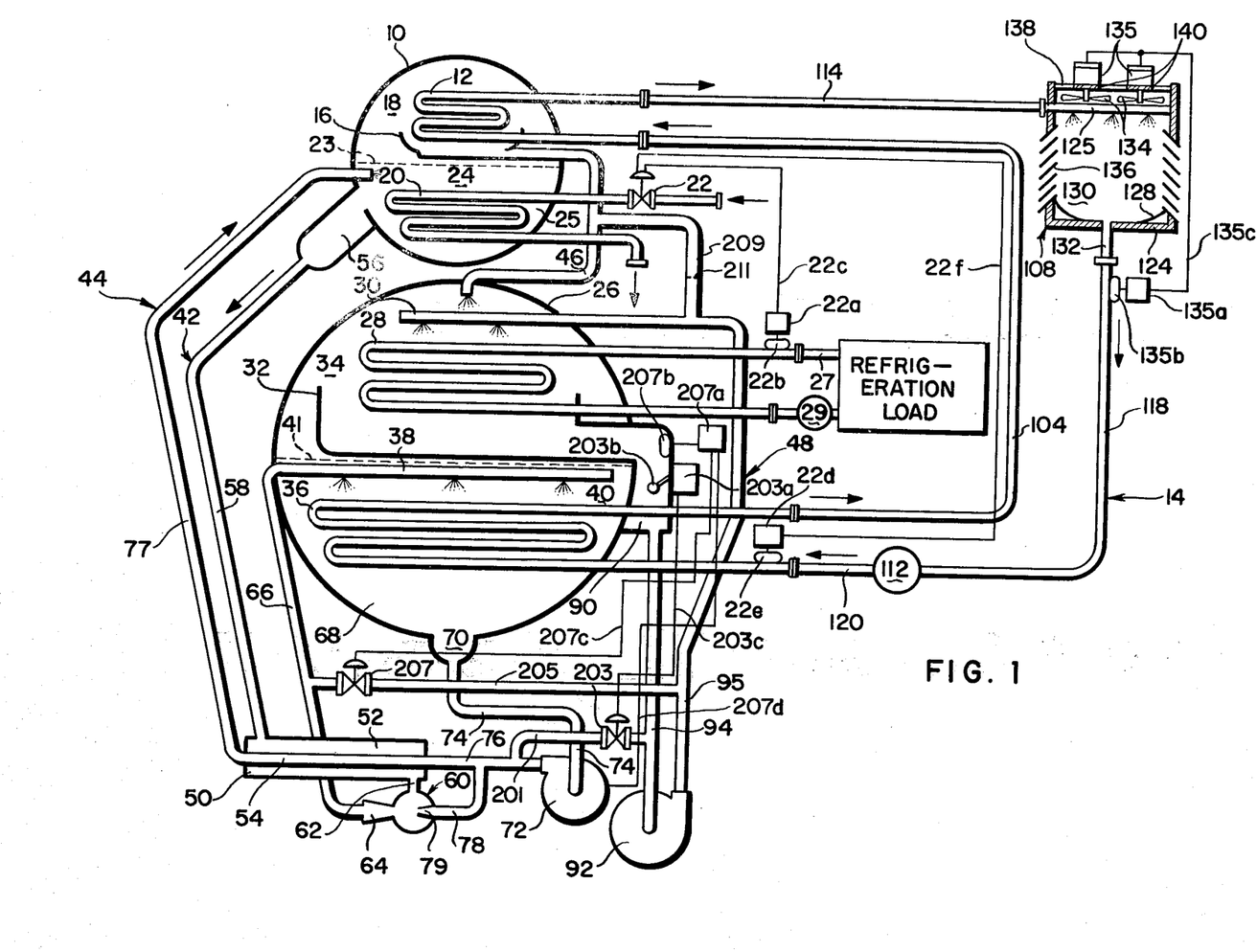
FIG. 1 is a schematic representation of an absorption refrigeration system constructed and adapted to be operated in accordance with the invention.

Referring to FIG. 1, an upper shell 10 encloses a heat-exchanger 12, hereinafter referred to as the condenser coil, which forms a portion of a cooling circuit 14. Positioned below condenser coil 12 is a receptacle means or condenser pan 16 which cooperates with condenser coil 12 and the upper portion of shell 10 to provide a condenser 18.

In the lower portion of shell 10 there is provided a heat-exchanger 20, hereinafter referred to as the heating coil, in which flow of a heating medium such as steam or hot water is regulated by a heating valve 22. A control means 22a is connected to heating valve 22 by a control line 22c. Control means 22a is also connected in any suitable manner to a temperature-sensitive element 22b. Heating coil 20 forms a portion of a heating circuit which also includes pump means as necessary, and a suitable source of heat, neither of which is shown. The lower portion of shell 10 and heating coil 20 cooperate to provide a generator 24, a generator sump 25 being formed by the lowermost portion of shell 10. An interrupted line 23 represents an imaginary plane of demarcation between condenser 18 and generator 24.

A lower shell 26 encloses a heat-exchanger 28, hereinafter referred to as the chilling coil, which forms a portion of a chilling circuit indicated generally at 27 and arranged to circulate chilled fluid to a refrigeration load. Also included in chilling circuit 27 is a pump 29. Positioned above the chilling coil 28 is a refrigerant distribution means or evaporator spray header 30 having spray nozzles arranged to distribute refrigerant over chilling coil 28 in heat-exchange relation therewith. Below chilling coil 28 is a receptacle means or evaporator pan 32 for collecting liquid refrigerant. Chilling coil 28, evaporator spray header 30, evaporator pan 32, and the upper portion of shell 26 cooperate to provide an evaporator 34.

Below evaporator pan 32 there is provided a heat-exchanger 36, hereinafter referred to as the cooling coil, which forms a portion of cooling circuit 14, condenser coil 12 being arranged in series with cooling coil 36. A solution distribution means or absorber spray header 38 positioned above cooling coil 36 is provided with a number of spray nozzles. Spray header 38, the lower portion of shell 26 and cooling coil 36 cooperate to provide an absorber 40, the nozzles of spray header 38 being arranged to distribute an absorbent solution in the upper portion of absorber 40. An interrupted line 41 represents an imaginary plane of demarcation between evaporator 34 and absorber 40.

Condenser 18, generator 24, evaporator 34 and absorber 40 are connected in a closed circuit for conducting the refrigerant and the absorbent solution in an absorption refrigeration cycle. The closed circuit also includes a concentrated solution passage means 42, a dilute solution passage means 44, a condensate line 46, and a refrigerant passage means 48. A shell-and-tube heat-exchanger 50 includes a shell side 52 which forms a portion of concentrated solution passage means 42, and a tube side 54 which forms a portion of dilute solution passage means 44. Concentrated solution passages means 42 also includes a concentrated solution receiver 56 communicating with generator 24, and a line 58 connecting concentrated solution receiver 56 with shell side 52 of heat-exchanger 50. An eductor 60 is also included in concentrated solution passage means 42, the eductor having an outlet 64 and a suction inlet 62, the latter communicating with shell side 52. A line 66 connecting eductor outlet 64 and absorber spray header 38 completes concentrated solution passage means 42.

An absorber sump 68 is formed by the lowermost portion of shell 26 and communicates with a dilute solution receiver 70 which forms a portion of dilute solution passage means 44. The latter also includes a solution pump 72, a line 74 connecting the solution pump inlet and dilute solution receiver 70, a line 76 connecting the solution pump outlet and tube side 54 of heat-exchanger 50, and a line 77 connecting tube side 54 and generator 24. A branch line 78 connects line 76, and thus the outlet of solution pump 72, with a motive fluid inlet 79 of eductor 60.

Condensate line 46 connects condenser pan 16 with evaporator 34 for delivery of condensed refrigerant to the evaporator. Refrigerant passage means 48 connects evaporator pan 32 with evaporator spray header 30 and includes a refrigerant receiver 90 communicating with evaporator pan 32, a refrigerant pump 92, a linee 94 connecting refrigerant receiver 90 with the refrigerant pump inlet, and a line 95 connecting the refrigerant pump outlet with evaporator spray header 30. Refrigerant passage means 48, evaporator pan 32 and evaporator spray header 30 cooperate to form a refrigerant circuit for the continuous circulation of liquid refrigerant to and from the interior of evaporator 34.

In addition to condenser coil 12 and cooling coil 36, cooling circuit 14 includes a line 104 for conducting a cooling medium from cooling coil 36 to condenser coil 12, a cooling tower 108, a pump 112, a line 114 leading from condenser coil 12 to cooling tower 108, a line 118 leading from cooling tower 108 to pump 112, and a line 120 leading from pump 112 to cooling coil 36.

Conventional systems normally include a cooling tower bypass line interconnecting lines 114 and 118, a three-way valve being situated at the T-junction formed by line 114 and the bypass line, as shown and described in the aforementioned U.S. Pat. No. 3,640,084. It is important to note that the bypass line, the three-way valve and valve control means for the latter have been omitted from the preferred embodiment of the present invention.

Cooling tower 108 typically includes a housing 124, a spray header 125 communicating with line 114 and having a number of spray nozzles, a receptacle means in the form of a cold-water basin 128 forming a sump 130, a cooling medium receiver 132 communicating with sump 130 and with line 118, and a plurality of fans 134, which may be driven directly, as shown, by electric motors 135, or by intermediate speed reduction mechanisms. Motors 135 are connected to a control means 135a by a control line 135c. Control means 135a is connected, in turn, by any suitable means to a temperature-sensitive element 135b. Housing 124 is provided with a plurality of louvered intake openings 136, a number of exhaust openings 138, and suitable mountings 140 for fans 134 and motors 135.

Aside from the omission of the cooling tower bypass arrangement, the structure heretofore described is common to a great many existing absorption refrigeration systems. Any number of additional features or modifications may be found in such systems but do not play any part in the present invention and have been omitted for the sake of clarity. Among these, for example, are purge devices for the removal of noncondensible gases from the system; so-called eliminators which permit the passage of vapor from evaporator 34 to absorber 40 but which act to divert liquid droplets entrained with the vapor to evaporator pan 32; and a solution valve which may be associated with dilute solution passage means 44 for reducing the rate of flow of solution therein at reduced capacities. On the other hand, a number of features shown and described herein are not found in certain existing systems. This is particularly true of eductor 60, which may be desirable when a single solution pump (72) is used, as in the present system.

Turning now to the elements added to the purely conventional structure in the preferred embodiment of the invention, an override control means 22d is connected in any suitable manner to a temperature-sensitive element 22e, which is positioned to sense the temperature of the cooling medium entering cooling coil 36. Override control means 22d is also connected to heating valve 22 by a control line 22f.

A solution transfer passage means provides communication between absorber sump 68 and the refrigerant circuit and includes a solution transfer line 201 interconnecting lines 76 and 94 and thereby connecting the inlet of refrigerant pump 92 with the outlet of solution pump 72. Flow through line 201 is controlled by a solution transfer valve 203, which is normally closed, as will be explained with greater particularity hereinafter. Valve 203 is connected to a control means 203a by a control line 203c. Control means 203a is associated with a level-sensitive element 203b located in refrigerant receiver 90.

A refrigerant transfer passage means provides communication between the refrigerant circuit and absorber 40 and includes a refrigerant transfer line 205 interconnecting lines 66 and 95 and thereby connecting the outlet of refrigerant pump 92 with absorber spray header 38. Flow through line 205 is controlled by a refrigerant transfer valve 207 which is normally closed, as explained hereinbelow. Valve 207 is connected to a control means 207a by a control line 207c. In addition, solution pump 72, or more particularly, the solution pump motor (not shown) is connected to control means 207a by a further control line 207d. Control means 207a is connected, in turn, to a temperature-sensitive element 207b, positioned to sense the temperature of liquid in refrigerant receiver 90.

A refrigerant flow line 209 interconnects line 95 and condensate line 46 to divert a portion of the flow of liquid from evaporator spray header 30 and to introduce the diverted liquid into the condensate flowing from condenser pan 16 to evaporator 34, as explained hereinbelow. Refrigerant flow line 209 is provided with an orifice plate 211 which meters the flow of liquid in line 209 at a predetermined rate.

For purposes of this description it will be assumed that water is used as the refrigerant, as the cooling medium in the cooling circuit 14, and as the fluid to be chilled in chilling coil 28 for circulation to the refrigeration load; that the heating medium circulated in heating coil 20 is steam; and that the absorbent solution is an aqueous solution of lithium bromide which may also contain suitable additives for improved heat transfer performance and the inhibition of corrosion. As previously noted, other fluids may be employed, and the invention is in no way restricted to the use of the foregoing substances.

Under certain conditions, as explained hereinafter, the liquid circulated in the refrigerant circuit may be a mixture of refrigerant and absorbent solution in accordance with the invention.

Conventional Operation

Conventional operation will now be described; that is, operation of the system with ambient temperatures sufficiently high that cooling water is provided which enters the cooling coil 36 at or near the maximum design temperature. It will be understood that the expressions "conventional," "normal" and "normally" as used hereinafter refer to such operation.

The pressure in lower shell 26 is maintained at a value (for example, about 7 mm. Hg absolute or 1/100 atmosphere) substantially lower than the pressure in upper shell 10 (about 75mm. Hg absolute or 1/10 atmosphere). The force of gravity and the pressure differential induce flow of condensed refrigerant from condenser pan 16 through condensate line 46 to the upper portion of evaporator 34 where a fraction of the condensed refrigerant flashes into vapor. As condensate entering the evaporator is vaporized, heat is abstracted from the water circulating in chilling coil 28. Unvaporized refrigerant is circulated in the refrigerant circuit, being collected in evaporator pan 32 from which it is conducted by way of refrigerator receiver 90, line 94, refrigerant pump 92 and line 95, to evaporator spray header 30, transfer valves 203 and 207 normally being closed. The liquid refrigerant is distrubuted by evaporator spray header 30 over chilling coil 28 for further vaporization and consequent abstraction of additional heat from the water to be chilled. Any vaporized refrigerant will continue to be collected by evaporator pan 32 for recirculation to evaporator spray header 30. For a purpose to be explained hereinafter, a portion of the refrigerant is diverted from the spray header to condensate line 46 by way of refrigerant flow line 209, at a rate controlled by orifice plate 211.

The water chilled in chilling coil 28 is circulated to the refrigerator load and returned to the chilling coil by the action of pump 29.

The refrigerant vaporized in evaporator 34 passes to absorber 40, owing to a slight pressure differential within shell 26 which arises from the absorption process and the effect of the sprays issuing from the nozzles of absorber spray header 38. The vaporized refrigerant comes in contact with and is absorbed by the solution issuing from the spray header. The solution is thereby diluted as it falls to absorber sump 68, the heat of solution being abstracted by the cooling water circulated in cooling coil 36.

Dilute absorbent solution is removed from absorber sump 68 by way of dilute solution receiver 70 and line 74, solution pump 72 acting to forward the dilute solution to generator 24 through line 76, tube side 54 of heatexchanger 50, and line 77. As previously noted, solution transfer valve 203 is normally closed.

The dilute solution is heated in generator 24 by the steam circulating in heating coil 20, whereby refrigerant is evaporated from the solution. The evaporated refrigerant rises to condenser 18 where it is liquefied by the rejection of the heat of evaporation to cooling water circulating in condenser coil 12, the refrigerant condensate being collected in evaporator pan 16 to complete the refrigerant cycle.

The evaporation of refrigerant from the absorbent solution is generator 24 increases the concentration of the solution, and the concentrated solution spills from generator sump 25 into concentrated solution receiver 56. The concentrated solution flows from receiver 56 through line 58 to shell side 52 of heat-exchanger 50, where it rejects heat to the dilute solution flowing through tube side 54. This exchange of heat enhances the efficiency of the system by cooling the concentrated solution to increase its capacity for absorption and by preheating the dilute solution on its way to generator 24. From shell side 52 the concentrated solution is drawn to suction inlet 52 of eductor 60. A portion of the flow of dilute solution from the outlet of solution pump 72 is diverted through branch line 78 to motive fluid inlet 79 of eductor 60 to provide a motive force for operation of the eductor. Consequently the concentrated solution entering suction inlet 62 and the dilute solution entering motive fluid inlet 79 are mixed in the eductor to provide a solution of intermediate concentration at outlet 64, the eductor acting to forward the intermediate solution through 66 to absorber spray header 38 for distribution in the upper portion of absorber 40, thus completing the absorbent solution cycle.

As previously pointed out, eductor 60 may be omitted from some systems. In the absence of eductor 60, the force of gravity and the pressure differential between shells 10 and 26 may be relied upon to conduct the concentrated solution from generator 24 to absorber spray header 38. Alternatively, a second solution pump may be provided in place of eductor 60, as shown and described in, for example, U.S. Pat. No. 3,254,499, issued June 7, 1966 to N. E. Hopkins and assigned to the assignee of the present invention.

Capacity control is exercised by employing heating valve 22 to regulate the flow of steam in heating coil 20. Also, as previously mentioned, a solution control valve (not shown) may be associated with dilute solution passage means 44. The position of heating valve 22 is normally controlled by control means 22a acting through control line 22c, override control means 22d being inactive during conventional operation. Control means 22a is typically a thermostat device responsive to temperature-sensitive element 22b, which is arranged to sense the temperature of the chilled water leaving the chilling coil 28. In a typical system, the refrigeration load might call for a leaving chilled water temperature of 44°F. at full load, whereas a low-load condition might call for a controlled leaving chilled-water temperature of 41°F., in which case heating valve 22 would be in a throttling position, control means 22a normally being a simple proportional control.

Turning now to the operation of cooling circuit 14, the cooling water enters cooling coil 36 from line 120 and thus from the outlet of pump 112. After it has circulated in cooling coil 36 to abstract heat from the absorbent solution in absorber 40, the cooling water is led through line 104 to condenser coil 12 where it is circulated to liquefy the evaporated refrigerant by abstracting the heat of evaporation. The heated cooling water is conducted from condenser coil 12 through line 114 to spray header 126 from which it issues downwardly in a series of sprays in contact with the ambient air, the air abstracting heat from the cooling water primarily by partial evaporation. The water thus cooled falls to sump 130 formed by cold water basin 138 and is conducted therefrom to the inlet of pump 112 by way of receiver 132 and line 118 to complete the cooling-water cycle. To provide the maximum cooling effect, fans 134 are operated to draw ambient air inwardly through louvered openings 136, upwardly through the cooling-water sprays, and outwardly through exhaust openings 138.

For this reasons discussed earlier in this specification, the temperature of the cooling water entering cooling coil 36 has heretofore been typically maintained at a high value, the design temperature usually being somewhere between 75°F. and 90°F., and it has been considered desirable for stable operation to maintain the entering temperature within 2½ degrees of the design temperature; that is, within a total range of 5°. Fine temperature control was accomplished by means of the control tower bypass line and associated three-way valve which have been omitted from the preferred embodiment described herein. Broad control was exercised by making use of the tower fans 134, either by varying the speed of fan motors 135 or by exercising on-off control.

Fan motors 135 are regulated by control means 135a acting through control line 135c. Control means 135a is typically a thermostat device responsive to temperature-sensitive element 135b, the latter element being arranged to sense the temperature of the cooling water leaving cooling tower 108. In the presently described embodiment, control of the cooling-water temperature is effected solely by means of fans 134, as explained hereinafter.

Operation with Variable Ambient Temperatures

It will be assumed, for the purposes of the following description, that the typical system under consideration has been operating with ambient temperatures in the highest range to be expected in the climate in which the system is located, and that consequently the cooling water has been entering absorber coil 36 at maximum design temperature; say, 85°F. The maximum temperature can be established through selection of cooling tower design features, such as, for example, the size, number and operating speeds of fans 134.

Under these conditions, the system will have been operating in the conventional manner heretofore described. With ambient temperatures in their highest range, it can also be assumed that the refrigeration load has been at or near the design maximum, although the magnitude of the load during conventional operation has little bearing on subsequent developments.

Now, assuming that ambient temperatures have begun to fall, fans 134 are nevertheless, for maximum steam economy, preferably maintained in operation to provide cooling water at the lowest temperature possible, down to a practicable minimum which may be as low as a few degrees above freezing, depending on the characteristics of and demands on the individual system. The minimum temperature is established by adjustment of control means 135a, which might be set to deenergize fan motors 135 when the temperature of the cooling water at temperature-sensitive element 135b is reduced to 55°F. and to reenergize the fan motors when the temperature rises to 65°F. Alternatively, the fan motors might be deenergized in sequence when the cooling-water temperature falls to 55°F. and 45°F., respectively, the motors being reenergized in reverse sequence when the temperature rises. Since many cooling towers are provided with four or more fans, and some with variable-speed fans, numerous control schemes are possible.

The minimum cooling water temperature is selected on the basis of maximum refrigeration requirements expected during periods of low ambient temperatures. If the cooling water temperature is permitted to fall too far in relation to the magnitude of the refrigeration load, excessive activity may take place in generator 24 with consequent carryover of absorbent solution to condenser 18. Thus, if a requirement for full load operation can be expected during periods of reduced ambient temperatures, the temperature of the cooling water leaving tower 108 might be held to a minimum of 65°F. in a typical system. In a similar system, if 80% of full load is the maximum expected, the cooling-water temperature might be limited to a minimum of 55°F. Such unseasonably high loads might be encountered, for example, in the case of cooling systems for industrial processes. In an ordinary air-conditioning installation, in which refrigeration requirements can be expected to decrease substantially as ambient temperatures decrease, safe and stable operation is entirely feasible, in accordance with the invention, with a cooling-water temperature as low as 40°F. at 10% of design full load.

To prevent excessive activity in generator 24 due to low cooling-water temperature, override control means 22d is provided to limit opening of heating valve 22. Override control means 22d is suitably a thermostat device responsive to temperature-sensitive element 22e, which is arranged to sense the temperature of the cooling water entering cooling coil 36, and might be set for a temperature of, say, 75°F. If at any time during operation the entering cooling-water temperature should fall below that value, or if on startup ambient conditions are such that cooling water is delivered to cooling coil 36 at a lower temperature, override control means 22d will transmit a signal to heating valve 22 by way of control line 22f to position the valve at a predetermined restricted setting. While this condition remains, any signals generated by control means 22a which call for greater valve openings will be overridden by the signal from override control means 22d, while any signals from control means 22a that call for even further reduced valve settings will be accepted.

As the temperature of the cooling water circulated in cooling coil 36 decreases, activity in absorber 40 increases because of the heightened affinity of the absorbent solution for refrigerant vapor. In the case of a system in which the refrigerant load is also reduced as the result of falling ambient temperatures, control means 22a generates a signal to valve 22 calling for a reduced valve setting. This reduces activity in generator 24 which, in turn, delivers less evaporated refrigerant to condenser 18, and as a result less refrigerant condensate is delivered to evaporator 34. These two conditions, namely decreased load and decreased cooling-water temperature, thus tend to reduce the concentration of the absorbent solution or, stated conversely, they tend to increase the dilution of the solution, with consequent depletion of refrigerant from the refrigerant circuit. The loss of refrigerant will be reflected in the level of liquid in evaporator pan 32 and refrigerant receiver 90. In the typical system, when the refrigeration load has been reduced to about 40% of full load and the temperature of the cooling water leaving cooling tower 108 has decreased to about 65°F., the level of refrigerant in receiver 90 will have fallen to the point at which further loss of refrigerant might result in cavitation at refrigerant pump 92, with consequent damage to the pump. These values, like others stated in this description, are given merely as examples since the initial volume of liquid in the refrigerant circuit will vary from design to design. The maximum volume is determined by the capacity of the refrigerant circuit and thus in large part by the dimensions of evaporator pan 32 and refrigerant receiver 90.

The level of liquid in receiver 90 is sensed by element 203b, which is shown as a simple float positioned at the end of a pivotable arm operatively associated with control means 203a to form a float switch, but other well-known level-sensing devices may be used with equal effect. When the predetermined minimum level is reached, element 203b actuates control means 203a to transmit an appropriate signal to solution transfer valve 203 by way of control line 203c. Valve 203, which may be a simple solenoid-actuated valve, is consequently moved from its closed to its open position to divert a portion of the flow of absorbent solution from the outlet of solution pump 72 to the inlet of refrigerant pump 92 by way of solution transfer line 201. The absorbent solution so diverted forms a mixture with the refrigerant and the mixture is forwarded by refrigerant pump 92 to evaporator spray header 30 by way of line 95. Valve 203 remains open until the level of liquid in refrigerant receiver 90 has risen to a second predetermined level somewhat above the first or minimum predetermined level. Attainment of the higher level is sensed by element 203b which now actuates control means 203a to transmit a closing signal to valve 203. This action is repeated as necessary to add absorbent solution to the liquid in the refrigerant circuit whenever the level thereof is reduced to the predetermined minimum, as sensed by element 203b. It will be apparent that, with each subsequent addition of absorbent solution to the liquid in the refrigerant circuit, the level of concentration of absorbent salts in the liquid will be raised.

The removal of absorbent solution to the refrigerant circuit has the added effect of reducing the capacity of absorber 40, thereby tending to inhibit further depletion of refrigerant. The presence of absorbent solution in the refrigerant circuit will also reduce the capacity of evaporator 34, but the reduced capacity actually assists in balancing the system under reduced refrigeration loads.

When ambient temperatures rise once again, with a consequent rise in cooling-water temperature and the refrigeration load, the absorbent solution will be removed from the refrigerant circuit in the normal course of operation by gradual attrition of liquid through the previously mentioned conventional eliminators (not shown), since such devices are not normally 100% effective. In some systems, however, especially those in which the load can be expected to rise rapidly as ambient temperatures rise, it may be desirable to provide a blowdown arrangement to accelerate the removal of absorbent solution from the refrigerant circuit and thus bring evaporator 34 to full capacity in a relatively brief period of time. Such blowdown arrangements are well known, and while they take a variety of forms, each is arranged to divert a portion of the liquid in the refrigerant circuit directly to absorber 40. A suitable blowdown arrangement is shown and described in the aforementioned U.S. Pat. No. 3,040,084.

When absorbent solution is present in the refrigerant circuit, or more particularly, when absorbent salts are present in the refrigerant liquid issuing from the nozzles of evaporator spray header 30, the vapor pressure in evaporator 34 may be lower than that which prevails when the refrigerant is pure water. Accordingly, pure refrigerant condensate entering the evaporator might tend to freeze at the outlet of condensate line 46. This condition is prevented, however, by introducing a controlled amount of liquid from the refrigerant circuit into the condensate by way of refrigerant flow line 209. When absorbent salts are present in the liquid in the refrigerant circuit and thus in the portion diverted to condensate line 46, they will lower the freezing temperature of the refrigerant condensate entering the evaporator and act to prevent the formation of ice at the outlet of condensate line 46.

As an alternative to the provision of line 209, condensate line 46 can be constructed to bypass evaporator 34 entirely by connecting the outlet of the condensate lne with refrigerant line 94 to deliver refrigerant condensate directly to the inlet of refrigerant pump 92. Such a construction is shown and described in U.S. Pat. No. 3,593,540, issued July 20, 1971 to N. E. Hopkins and assigned to the assignee of the present invention.

Failure to exercise close control of the cooling-water temperature; that is, omission of the cooling tower by-pass line and associated three-way valve, renders the system particularly sensitive to changes in load. To illustrate, even a slight reduction in load causes a corresponding reduction in the temperature of the chilled water leaving chilling coil 28. This is sensed by element 22b, causing control means 22a to generate a signal which repositions heating valve 22 in a more nearly closed position. This, in turn, tends to reduce the load on condenser 18 and hence the load on cooling tower 108, thereby lowering the temperature of the cooling water entering cooling coil 36. The reduction in cooling-water temperature increases activity in the absorber and consequently in evaporator 34, causing the chilled-water temperature to be further reduced, with consequent repositioning of heating valve 22 in a still more nearly closed position. This cumulative cyclic effect becomes especially severe when one or both of cooling tower fans 134 is started, thereby causing a sudden and rapid decrease in cooling-water temperature. If the cyclic reduction of the chilled-water and cooling-water temperatures is permitted to continue, the condition can become sufficiently severe that the temperature of the refrigerant in evaporator 34 will approach freezing.

To prevent this from occurring and yet permit continuous operation of the system, refrigerant transfer line 205 and the associated refrigerant transfer valve 207 are provided. Control means 207a, which is suitably a thermostat device, is set for a temperature of, say, 35.5°F. When the temperature of the liquid in refrigerant receiver 90 falls to this value, as sensed by element 207b, control means 207a transmits an appropriate signal to valve 207 by way of control line 207c, whereby valve 207, which may be a simple solenoid-actuated valve, is moved from its closed to its open position. This causes a portion of the liquid in the refrigerant circuit to be diverted from the outlet of refrigerant pump 92 directly to absorber spray header 38, thus immediately diluting the absorbent solution delivered to the absorber sprays and rapidly reducing activity in the absorber to prevent further reduction of the temperature of the refrigerant in evaporator 34.

Control means 207a is further set to transmit a closing signal to valve 207 when element 207b senses a rise in refrigerant temperature to, say, 35.75°F. As a final precaution, control means 207a is set to transmit a signal by way of control line 207d which will deenergize solution pump 72 if for any reason the temperature of the liquid in the refrigerant circuit should fall to, say, 34°F. Control means 207a is thus a two-stage thermostat device. Alternatively, control line 207d may be arranged to connect control means 207a with cooling-water pump 112 instead of solution pump 72, or more particularly, with the motor (not shown) of the cooling-water pump. The object in either case is to immediately halt refrigeration if the lower or minimum predetermined temperature is sensed by element 207b.

The Alternative Embodiment

With cooling water circulating in absorber cooling coil 36 at reduced temperatures, the temperature of the dilute absorbent solution flowing through tube side 54 of heat-exchanger 50 will also be reduced. In some installations, this may substantially increases the possibility of crystallization of the concentrated solution is shell side 52 of the heat-exchanger. Accordingly, in the alternative embodiment illustrated in FIG. 2, refrigerant transfer line 205 may be connected to communicate with line 58 instead of line 66, preferably at a point immediately upstream of shell side 52 of heat-exchanger 50. Elements of the system which do not figure in the ensuing description have been omitted from FIG. 2 in the interests of clarity but may be considered identical with those shown in FIG. 1. Elements common to both figures are identified by the same reference numerals in each.) With this arrangement valve 207 is arranged to receive signals from any suitable control means 313a arranged to sense incipient crystallation in shell side 52. Control means 213a will temporarily open valve 207 to introduce liquid from the refrigerant circuit into line 58 and thus directly to shell side 52 to bring about immediate dilution of the solution. The control means is preferably connected to a timing means 213b connected, in turn, by way of a control line 213c to valve 207. The timing means is set to close the valve after a predetermined length of time and to repeat the opening of the valve periodically until the crystallization condition has been alleviated. Control means 213a is also preferably connected by way of a separate control line 213b to heating valve 22 to restrict flow in heating coil 20 until the crystallization condition is alleviated, thereby reducing the concentration of the solution leaving generator 24.

Figure 2:
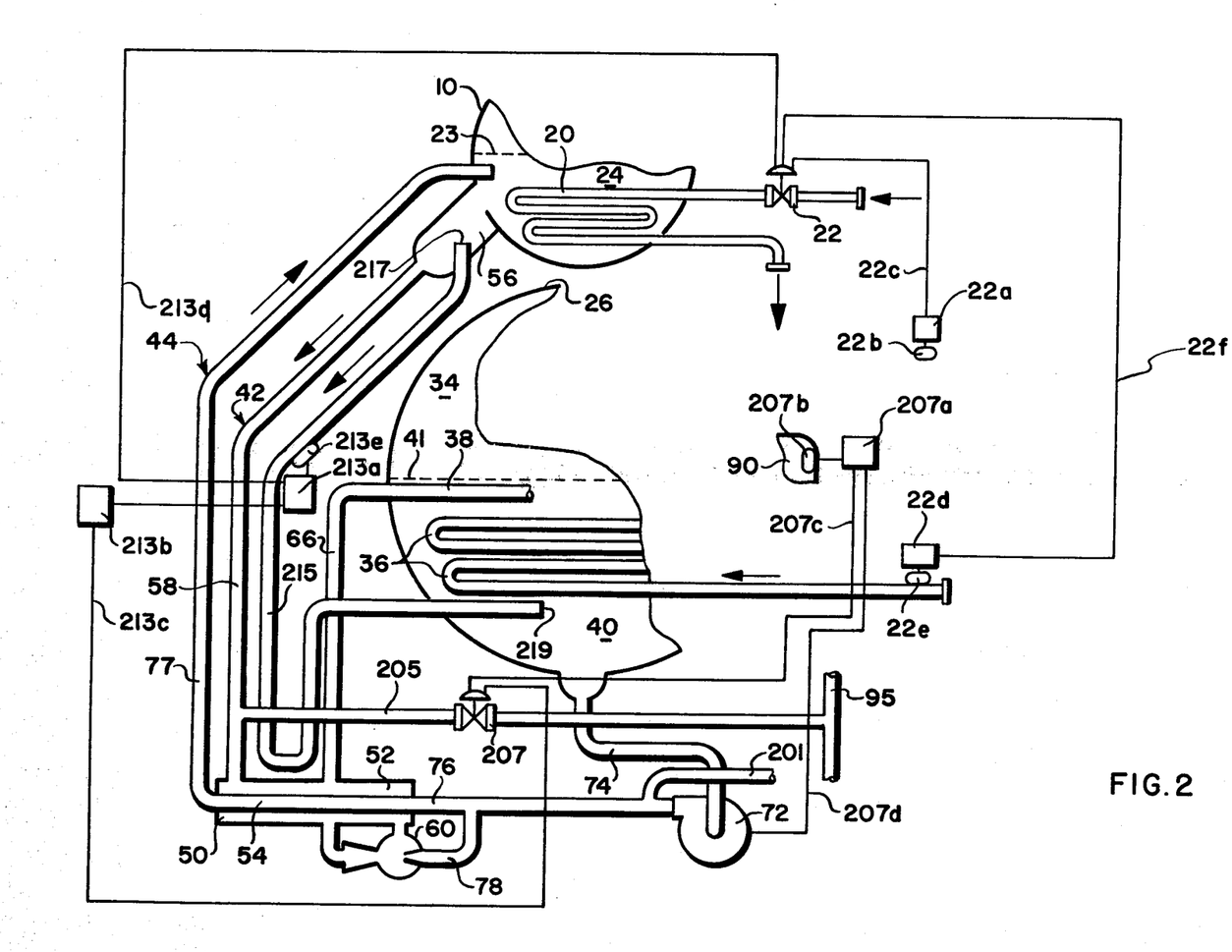
FIG. 2 is a partial schematic representation of an absorption refrigeration system similar to that of FIG. 1 but depicts features of an alternative embodiment of the invention.

By way of example, when control means 213a senses an impending crystallization condition and actuates timing means 213b, the timing means transmits an opening signal to transfer valve 207. Simultaneously the control means generates a signal to heating valve 22 to position the latter valve at a restricted setting. At the end of, say, a 2 minute period, a further signal is transmitted by the timing means to valve 207 to close that valve. At the end of a further, say 8 minute period, if control means 213a continues to sense the condition in question, an opening signal is again transmitted to valve 207 and maintained for another 2 minute period, the 10 minute cycle being repeated until the crystallization condition is alleviated. When the control means no longer senses the crystallization condition, it will transmit a signal to heating valve 22 to release the latter valve from the restricted setting regardless of the position of valve 207.

It should be pointed out that in the embodiment of FIG. 2, refrigerant transfer valve 207 remains subject to signals from control means 207a since dilution of the solution in shell side 52 of heat exchanger 50 will quickly result in the dilution of the solution issuing from spray header 38. Thus, valve 207 and refrigerant transfer line 205 perform two important functions, namely to prevent a freezing condition in evaporator 34 and a crystallization condition in heat-exchanger 50, either of which is more likely to occur when the cooling tower bypass arrangement is omitted, in view of the resulting possibility of rapid changes in cooling-water temperature. A similar valve, performing similar functions and applied to a combined absorption and steam turbine driven system, is disclosed in U.S. Pat. No. 3,314,246, issued Apr. 18, 1967 to N. E. Hopkins and R. F. Muhleman and assigned to the assignee of the present invention.

It will be apparent that, in the embodiment of FIG. 2, refrigerant transfer line 207 may be connected to communicate with line 66 as in the embodiment of FIG. 1 (instead of with line 58), in which case when valve 207 was opened there would be a slight delay in dilution of the concentrated solution in shell side 52 of heatexchanger 50 but an immediate reduction of activity in absorber 40. In some installations this arrangement might be preferable, the choice depending on whether the greater speed of response is desired in shell side 52 or in absorber 40.

The restricted maximum settings imposed on valve 22 by control means 213a and by override control means 22d may be identical or they may differ, as determined by the characteristics and requirements of the individual system. In the latter case the more restricted setting will govern if both control means are active at the same time.

Control means 213a is preferably a thermostat device associated with a temperature-sensitive element 213e positioned to sense the temperature of solution in an overflow means, such as an overflow tube 215 communicating with concentrated solution receiver 56 and having its inlet 217 positioned above the normal level of fluid in the solution receiver. When crystallization, which is a progressive process, begins in shell side 52 of heat-exchanger 50, flow in line 58 is retarded, causing the level of solution in receiver 56 to rise. When the level reaches the inlet of the overflow tube, which normally has its outlet 219 in communication with absorber 40, a portion of the relatively hot concentrated solution enters the overflow tube. The resulting increase in temperature in the overflow tube, say, to 140°F., is detected by temperature-sensitive element 213e begin the remedial action described above. A decrease in temperature in overflow tube 215 sufficient to indicate that concentrated solution has ceased to enter the tube will actuate control means 213a release heating valve 22 from its restricted setting and to condition timing means 213b to discontinue the periodic opening of valve 207. A similar overflow arrangement and associated control means are shown and described in U.S. Pat. No. 3,410,104, issued Nov. 12, 1968 to N. E. Hopkins and assigned to the assignee of the present invention.

It will be obvious that, instead of a temperature-sensitive control means, a float switch similar to that provided by control means 203a and element 203b (FIG. 1) might be associated with overflow tube 215 to detect the entrance of concentrated solution into the tube. However, the temperature-sensitive control means is preferred because excess solution sometimes spills over into the overflow tube on startup before generator 24 achieves the required capacity, there being no crystallization condition present. A float switch is unable to distinguish between the two conditions. On the other hand, since the solution spilled over on startup is relatively cool, its temperature being substantially below the 140°F. example mentioned above, the preferred temperature-sensitive control means will act to open valve 207 only in the event of incipient crystallization.

While the invention has been described in connection with specific embodiments thereof, it is to be understood that this is by way of illustration and not by way of limitation; and the scope of the appended claims should be construed as broadly as the prior art will permit.

I claim:

1. A method of operating an absorption refrigeration apparatus of the type comprising a generator, a condenser, an evaporator, and an absorber all connected to provide a continuous cycle absorption system wherein an absorbent solution, consisting essentially of an aqueous solution of a hygroscopic salt, and a refrigerant consisting essentially of water, are circulated through said system and wherein relatively dilute solution is transferred to the generator wherein water vapor is released to the condenser, and wherein the condensed vapor from said condenser is transferred to said evaporator where it is brought into indirect contact with a heat exchange medium supplied to a load, and wherein the water vapor released in said evaporator is absorbed by absorbent solution in said absorber, thereby diluting the same, and wherein relatively concentrated solution is transferred from said generator to said absorber to maintain the absorbent solution at an effective concentration level, comprising the steps of: withdrawing liquid refrigerant from said evaporator by means of a pump and recirculating it back into indirect contact with said heat exchange medium to provide a refrigerant circuit, collecting liquid refrigerant in said evaporator to maintain a reservoir thereof, the level of which fluctuates, in the regular operation of the system between a normal upper limit indicative of a high demand condition and/or high absorber temperatures and a normal lower limit indicative of low demand conditions and/or low absorber temperatures; sensing the level of refrigerant collecting in said evaporator; and transferring absorbent solution from said absorber to said refrigerant circuit when the level of said refrigerant is substantially below said normal lower level to maintain an adequate supply of liquid in said circuit and thereby prevent cavitation of said pump.

2. An absorption refrigeration apparatus comprising a generator, a condenser, an evaporator, and an absorber all connected to provide a continuous cycle absorption system wherein an absorbent solution, consisting essentially of an aqueous solution of a hygroscopic salt, and a refrigerant, consisting essentially of water, are circulated through said system and wherein relatively dilute solution is transferred to the generator wherein water vapor is released to the condenser, and wherein the condensed vapor from said condenser is transferred to said evaporator where it is brought into indirect contact with a heat exchange medium supplied to a load, and wherein the water vapor released in said evaporator is absorbed by absorbent solution in said absorber, thereby diluting the same, and wherein relatively concentrated solution is transferred from said generator to said absorber to maintain the absorbent solution at an effective concentration level, pump means for withdrawing liquid refrigerant from said evaporator and recirculating it back into indirect contact with said heat exchange medium to provide a refrigerant circuit, means for collecting liquid refrigerant in said evaporator to maintain a reservoir thereof, the level of which fluctuates, in the regular operation of the system between a normal upper limit indicative of high demand condition and/or high absorber temperatures and a normal lower limit indicative of low demand conditions and/or low absorber temperatures; means sensing the level of refrigerant collecting in said evaporator; and means for transferring absorbent solution from said absorber to said refrigerant circuit when the level of said refrigerant is substantially below said normal lower level to maintain an adequate supply of liquid in said circuit and thereby prevent cavitation of said pump means.

3. Apparatus as defined in claim 2 in which said means for sensing the level of refrigerant collecting in said evaporator comprises a float actuated switch adapted to actuate valve means associated with said means for transferring absorbent solution to said refrigerant circuit.

* * * * *